(12) United States Patent
Studdiford et al.

(10) Patent No.: US 8,384,664 B2
(45) Date of Patent: Feb. 26, 2013

(54) OPTO-ELECTRONIC SYSTEM FOR CONTROLLING PRESENTATION PROGRAMS

(75) Inventors: John Paul Studdiford, Far Hills, NJ (US); Joe K. Tannehill, Jr., Panama City, FL (US); Edward M. Boardway, Lynn Haven, FL (US)

(73) Assignee: John Paul Studdiford, Far Hills, NJ (US)

( * ) Notice: Subject to any disclaimer, the term of this patent is extended or adjusted under 35 U.S.C. 154(b) by 740 days.

(21) Appl. No.: 12/565,631

(22) Filed: Sep. 23, 2009

(65) Prior Publication Data
US 2011/0069002 A1    Mar. 24, 2011

(51) Int. Cl.
*G09G 5/00* (2006.01)

(52) U.S. Cl. ............... 345/156; 345/166; 348/14.05

(58) Field of Classification Search ............ 348/14.05
See application file for complete search history.

(56) References Cited

U.S. PATENT DOCUMENTS

| | | | |
|---|---|---|---|
| 5,045,843 A | 9/1991 | Hansen | |
| 6,097,373 A | 8/2000 | Jakobs | |
| 6,275,214 B1 | 8/2001 | Hansen | |
| 6,594,616 B2 | 7/2003 | Zhang et al. | |
| 6,600,478 B2 | 7/2003 | White et al. | |
| 6,729,731 B2 | 5/2004 | Gnanamgari et al. | |
| 6,770,864 B2 | 8/2004 | Yan | |
| 6,952,198 B2 | 10/2005 | Hansen | |
| 6,967,644 B1 * | 11/2005 | Kobayashi | 345/158 |
| 6,979,087 B2 | 12/2005 | Honig et al. | |
| 7,091,949 B2 | 8/2006 | Hansen | |
| 8,094,121 B2 * | 1/2012 | Obermeyer et al. | 345/156 |
| 2002/0186351 A1 | 12/2002 | Gnanamgari et al. | |
| 2003/0174163 A1 | 9/2003 | Gnanamgari et al. | |
| 2003/0178554 A1 * | 9/2003 | Zak | 250/221 |
| 2004/0095317 A1 * | 5/2004 | Zhang et al. | 345/158 |
| 2005/0183020 A1 | 8/2005 | Gnanamgari et al. | |
| 2005/0184958 A1 | 8/2005 | Gnanamgari et al. | |
| 2005/0188316 A1 | 8/2005 | Ghanamgari et al. | |
| 2008/0030470 A1 * | 2/2008 | Rensberger et al. | 345/163 |
| 2008/0186720 A1 * | 8/2008 | Verbrugh | 362/383 |
| 2008/0218361 A1 * | 9/2008 | Parker et al. | 340/584 |
| 2008/0297323 A1 * | 12/2008 | Barkan | 340/10.31 |
| 2010/0004794 A1 * | 1/2010 | Ziemkowski et al. | 700/297 |

OTHER PUBLICATIONS

Armenio, Christopher, "Design of a Laser Controlled Mouse Using Open CV".

Printout of "Computer Laser Accessories Business Plan," available online at www.bplans.com/computer_laser_accessories_business_plan/executive_summary_fc.cfm Dated Jun. 17, 2009.

Printout of "Laserspotcam," available online at www.raphnet.net/programmation/laserspotcam/laserspotcam_en.php Dated Jun. 17, 2009.

Printout of "Control your computer using a laser or IR pen," available online at www.instructables.com/id/Control-your-computer-using-a-laser-or-IR-pen/ Dated Jun. 17, 2009.

(Continued)

*Primary Examiner* — Lixi C Simpson
(74) *Attorney, Agent, or Firm* — Klarquist Sparkman, LLP

(57) ABSTRACT

An input device for controlling a presentation program that is being run on a remote computing device is provided. The input device includes a first optical sensor configured to be activated by exposure to a focused beam of light and a second optical sensor configured to be activated by exposure to a focused beam of light. An RF communication device wirelessly delivers the instructional signals to the remote computing device to advance or reverse the presentation program.

23 Claims, 5 Drawing Sheets

OTHER PUBLICATIONS

Printout of "Green Laser Presenter & Computer Slideshow Control," available online at http://thelaserguy.stores.yahoo.net/spgrrflapr.html Dated Jun. 17, 2009.

Printout of "Basic remote control system using laser beam," available online at www.softwerk.ru/bazsystem_e.htm Dated Jun. 17, 2009.

Printout of "Remote computer control using a laser pointer," available online at www.softwerk.ru/lmouse_e.htm Dated Jun. 17, 2009.

Printout of "The Game System on PC using laser blaster control," available online at www.softwerk.ru/gamsystem_e.htm Dated Jun. 17, 2009.

Printout of "USB Wireless Remote Control Red Laser Pointer(BT-RLP05)," available online at www.diytrade.com/china/4/products/3637889/USB_Wireless_Remote_Control_Red Dated Jun. 17, 2009.

* cited by examiner

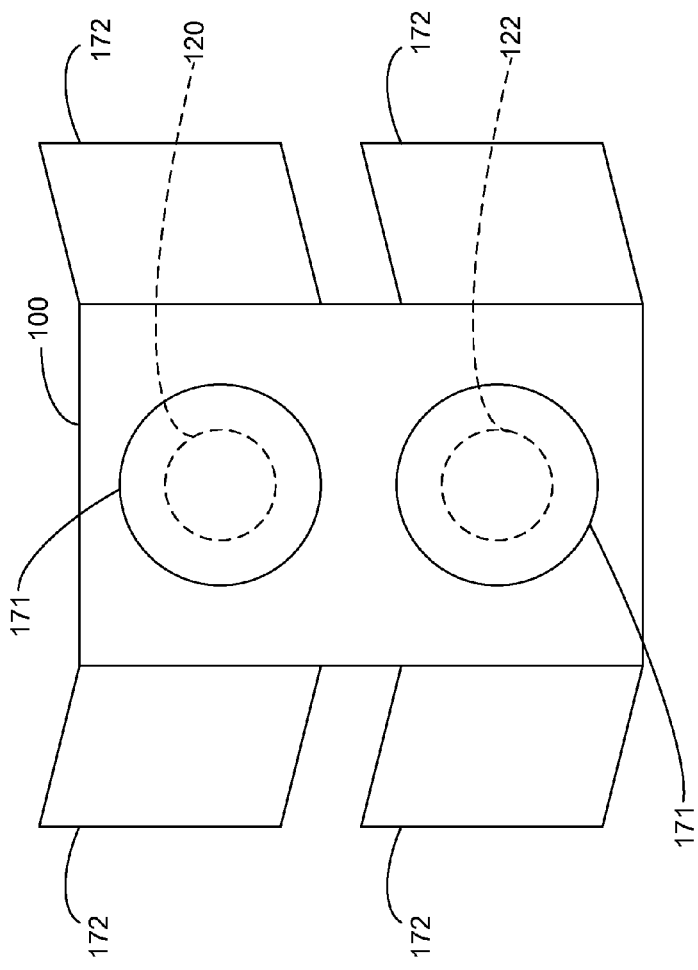
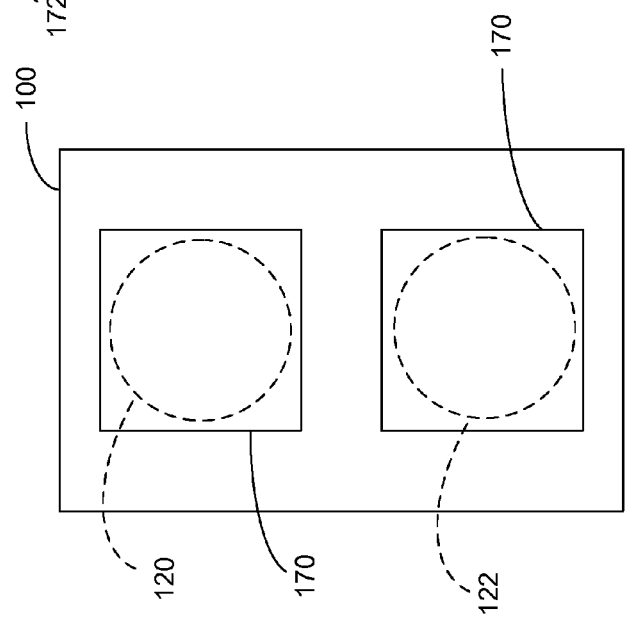

OPTO-ELECTRONIC SYSTEM FOR CONTROLLING PRESENTATION PROGRAMS

FIELD

The present disclosure is directed to methods and apparatuses that facilitate the use of computer presentation software.

BACKGROUND

Presentation programs, typically in the form of slide show presentations, are commonly used to present information to an audience. Such presentation programs include, for example, PowerPoint® available from Microsoft Corporation and Keynote® available from Apple Corporation. Slide show presentations are generally shown on computer or television screens, or projected onto large projection screens. Such slide shows have many advantages over conventional visual aids such as pamphlets, chalkboards, flip charts, posters, and overhead transparencies. For example, slide show presentations are relatively easy to make and do not require the purchase and/or production of printed materials.

Each slide show presentation generally includes a number of individual pages or slides that contain text or graphics arranged thereon. Slide show presentations can be generated, saved, and run on a computing device, such as a desktop or laptop computer. Conventionally, the advancement from one slide to the next is achieved in one of the following two ways. Either someone (e.g., the presenter or another person) must access the computer directly to enter a keystroke or mouse-click to advance the presentation, or the presenter must use a conventional remote advancement device (e.g., a clicker) that is connected to the computer (e.g., via a Universal Serial Bus (USB) device) to advance the presentation. However, both of these methods of advancement have disadvantages.

Directly accessing the computer to advance the presentation is disadvantageous because the presenter must be at the computer in order to change the slide of the presentation program. Thus, the presenter either must remain physically near the computer during the entire presentation or the presenter must return to the computer between slides. This can be a distraction both to the presenter and to the presenter's audience.

The use of a conventional remote advancement device (e.g., a clicker) and USB connector also has its disadvantages. Such devices can usually only be operated with the matching USB linking device. Thus, different presenters who do not have the same device remote advancement device cannot make use of the USB linking device. In addition, such devices are often misplaced or lost and the presenter then must resort to advancing the presentation using the direct access approach discussed above.

Accordingly, there is a need for a more efficient and user-friendly device that permits remote advancement of presentation programs.

SUMMARY

In one embodiment, an input device is provided for controlling a presentation program that is being run on a remote computing device. The presentation program can include at least a first slide and a second slide. The input device can include a plurality of optical sensors, a processing unit, and an RF communication device. The plurality of optical sensors can be configured to be activated by exposure to a focused beam of light and configured to generate one or more signals upon exposure to the focused beam of light. The processing unit can be configured to receive the signals and produce an instructional signal containing an instruction for changing a displayed slide of the presentation program from the first slide to the second slide. The RF communication device can be configured to wirelessly deliver the instructional signal to the remote computing device. Each optical sensor can be spaced apart from each of the other optical sensors so that the focused beam of light can be directed to one of the plurality of optical sensors without activating an adjacent optical sensor.

In a specific implementation, the first and second slides are ordered in the presentation program so that the first slide comes before the second slide, and there are only two optical sensors, the first optical sensor and the second optical sensor. Activation of the first optical sensor results in a first instructional signal for changing the displayed slide of the presentation program from the first slide to the second slide, and activation of the second optical sensor results in a second instruction signal for changing the displayed slide from the second slide to the first slide.

In another specific implementation, the RF communication device comprises a Bluetooth® transceiver. In yet another specific implementation, the first and second optical sensors can each comprise one or more cadmium sulfide cells.

In another specific implementation, the first instructional signal comprises a Page Down command and the second instructional signal comprises a Page Up command. In yet another specific implementation, the first and second optical sensors can be configured to be activated by exposure to a focused beam of light directed from a laser pointer.

In another specific implementation, the processing unit can include an analog-to-digital converter for converting the signals generated by the optical sensors to one or more numerical values. The processing unit can compare the numerical values against one or more predetermined values to determine whether the first or second instructional signals should be produced. In one specific implementation, the predetermined values are adjustable. In another specific implementation, the predetermined values can correspond to a dwell time of the focused beam of light on the first or second optical sensors. For example, the dwell time required to produce the first or second instructional signals can be between about 0.50 and 0.75 seconds.

In another specific implementation, a calibration member is provided. The calibration member is configured to receive ambient light and adjust the sensitivity of the optical sensors based on a value assigned by the calibration member to the received ambient light.

In another embodiment, a kit is provided for controlling a presentation program that is being run on a remote computing device and outputted to a display device. The kit can comprise a laser pointer for generating a focused beam of light and a portable input device configured to be positioned adjacent the display device. The portable input device can include a first photoresistor sensor having a first light sensitive surface and a second photoresistor sensor having a second light sensitive surface. A processing unit can be coupled to the first and second photoresistor sensors and configured to produce a first instructional signal when a focused beam of light is directed at the first light sensitive surface and a second instructional signal when a focused beam of light is directed at the second light sensitive surface. An RF communication device can be coupled to the processing unit and configured to transmit the first and second instructional signals to the remote computing device. The first instructional signal is configured to advance the presentation program displayed on the display device and the second instructional signal is configured to reverse the presentation program displayed on the display device.

In a specific implementation, the first and second photoresistor sensors can be spaced apart from each other so that the focused beam of light can be directed to either of the first and second photoresistor sensors without activating the other photoresistor sensor.

In another specific implementation, the first instructional signal can comprise a Page Down command and the second instructional signal comprises a Page Up command. In yet another specific implementation, the laser pointer can have only a single mode of operation in which the laser pointer generates light of substantially the same power or intensity.

In another specific implementation, the first or second instructional signals are not produced unless a focused beam of light remains on the first or second photoresistor sensors for a predetermined amount of time. For example, the predetermined time required to produce the first or second instructional signals can be between about 0.50 and 0.75 seconds. The predetermined amount of time can be adjustable by a user/presenter.

In another specific implementation, the laser pointer is configured to emit light of a first wavelength. The input device further comprises one or more wavelength filters that at least partially cover the first and second photoresistor sensors, with the one or more wavelength filters being configured to allow light of the first wavelength to pass through the wavelength filter.

In another specific implementation, the input device further comprises a lens or a reflector configured to direct light at the first and second photoresistor sensors. The lens or reflector configured to increase a target size of the first and second photoresistor sensors.

In another embodiment, a method of presenting a presentation program is provided. Though not limited to this order, the method comprises the steps of (1) running a presentation program on a computing device and displaying the presentation program on a display device; (2) providing an input device adjacent the display device, the input device having a first optical sensor and a Bluetooth® compatible transceiver; (3) activating the input device and establishing a wireless communication link between the Bluetooth® compatible transceiver and the computing device; (4) providing a laser pointer that emits focused light that cannot be modulated in power or intensity; (5) directing light from the laser pointer at the first optical sensor and causing the input device to produce a first instructional signal that is indicative of an instruction to advance the presentation program; and (6) transmitting the first instructional signal to the computing device to advance the presentation program via the wireless communication link.

In a specific implementation, the input device further comprises a second optical sensor and the method further comprises the step of directing light from the laser pointer at the second optical sensor and causing the input device to produce a second instructional signal that is indicative of an instruction to reverse the presentation program. The second instructional signal is transmitted to the computing device to reverse the presentation program via the wireless communication link.

In yet another specific implementation, the input device has only two optical sensors and the two optical sensors, the first and second optical sensors, are spaced apart from one another so that the focused light can be directed to one of the two optical sensors without activating the other optical sensor.

The foregoing and other objects, features, and advantages of the invention will become more apparent from the following detailed description, which proceeds with reference to the accompanying figures.

BRIEF DESCRIPTION OF THE DRAWINGS

FIG. 3 is a schematic illustration of an input device of the present disclosure, shown with an optional wavelength filter.

FIG. 4 is a schematic illustration of an input device of the present disclosure, shown with optional lenses and reflectors.

DETAILED DESCRIPTION

The following detailed description includes references to the accompanying drawings, which form a part of the detailed description. The drawings show, by way of illustration, example embodiments in which the subject matter may be practiced. These embodiments, which are also referred to herein as "examples," are described in enough detail to enable those skilled in the art to practice the subject matter. The embodiments may be combined, other embodiments may be used, or structural, logical, and electrical changes may be made without departing from the scope of the present subject matter. The following detailed description is, therefore, not to be taken in a limiting sense, and the scope of the present subject matter is defined by the appended claims and their equivalents.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernable, based on this disclosure, by one of ordinary skill in the art) in which the disclosed system, method, and apparatus can be used in combination with other systems, methods, and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Figure 1A:
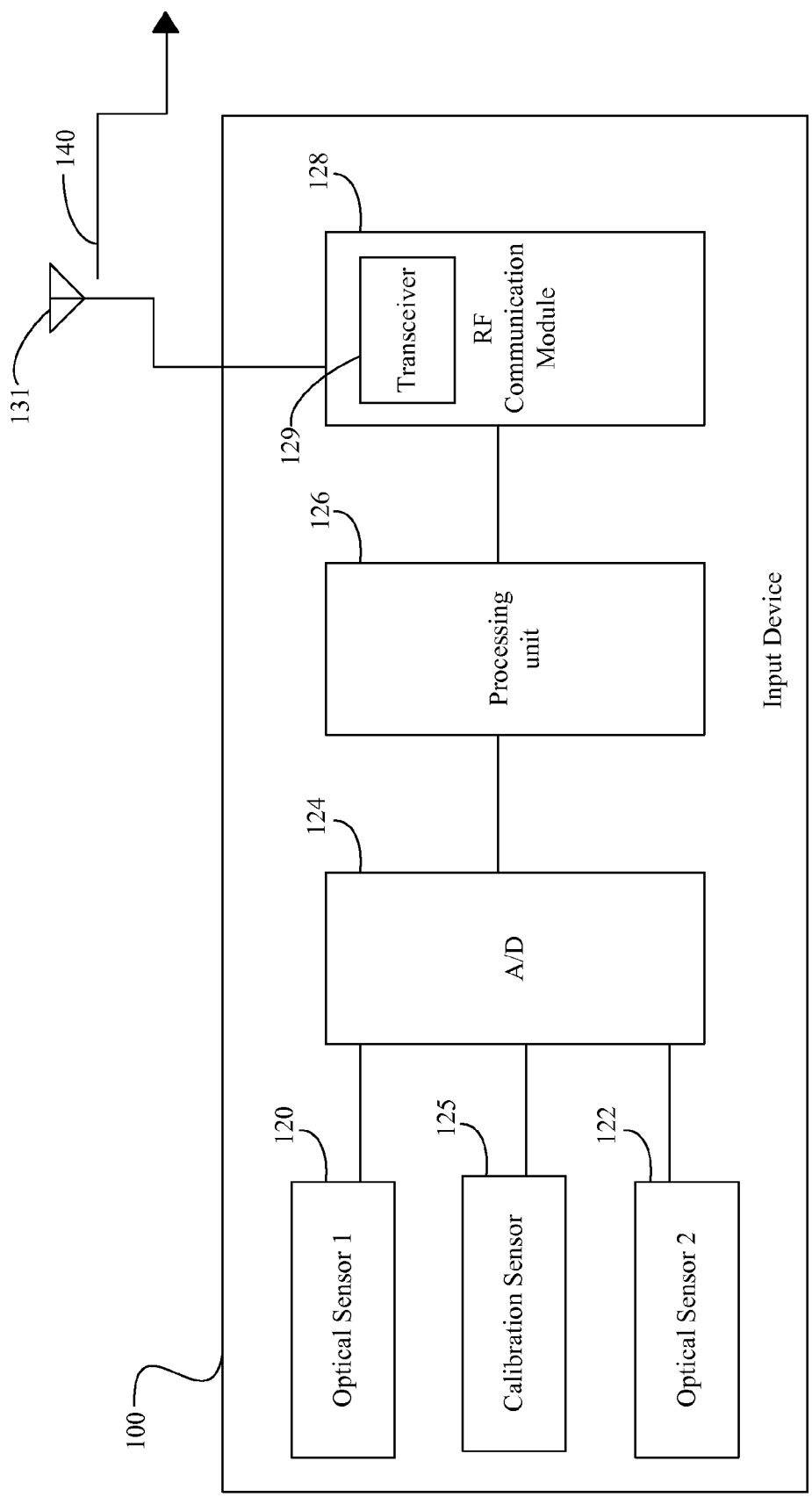
FIG. 1A is a schematic illustration of an input device for controlling a presentation program.
Figure 1B:
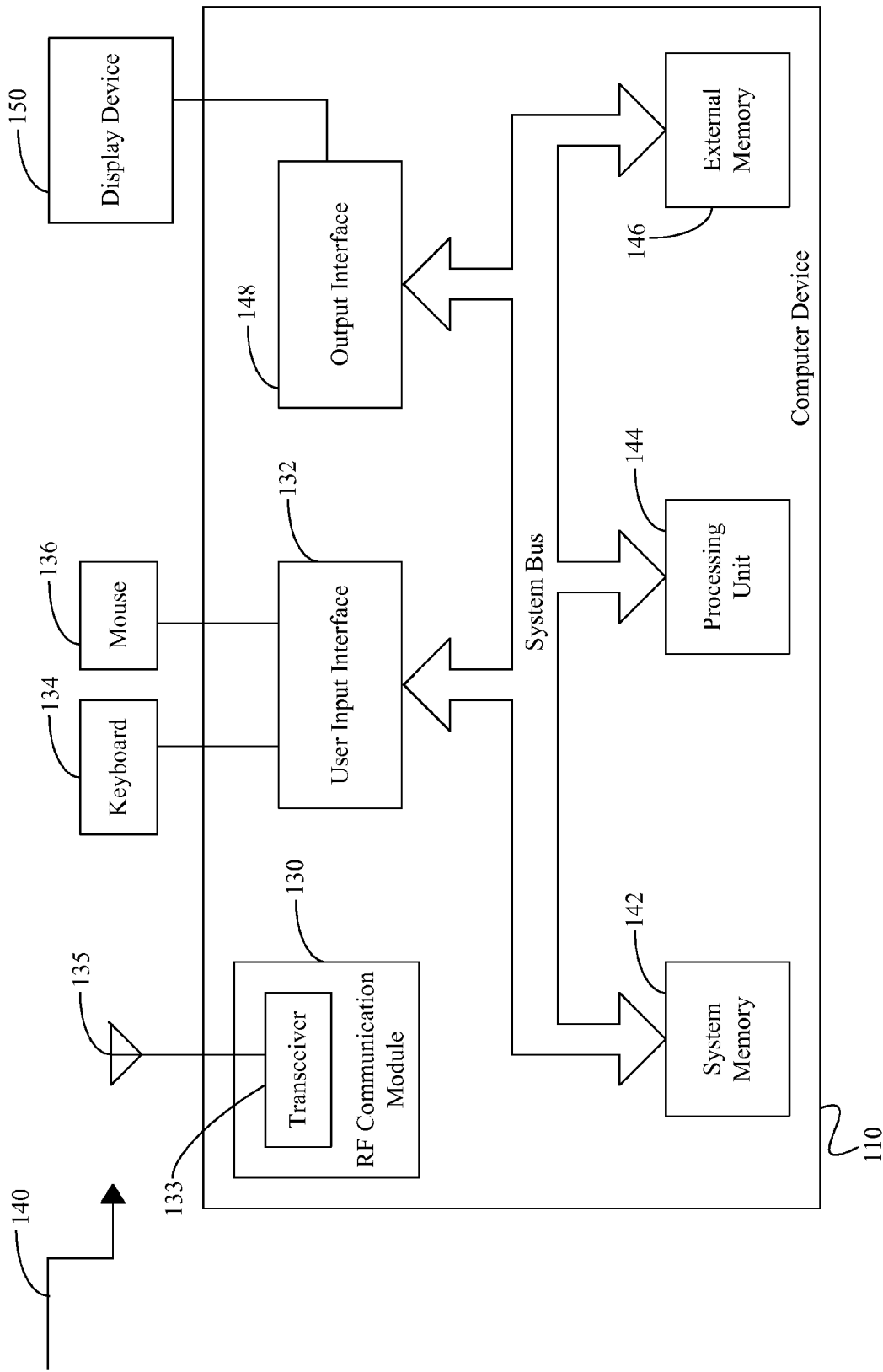
FIG. 1B is a schematic illustration of a computing device for running a presentation program that is controllable by the input device of FIG. 1A.

FIGS. 1A and 1B illustrate an input device 100 for remotely controlling a computing device 110 that is running a presentation program. The term "presentation program" generally refers to any computer program or system that is capable of displaying a series of selected pictures, images, graphics, text, audio and/or video. The series of selected pictures, images, graphics, text, audio and/or video are generally placed in discrete parts called slides. During a presentation, the presenter can sequentially display a first slide, a second slide, and so on, until all of the slides in the presentation program have been displayed.

Presentation programs can be useful to convey information of a variety of types to an audience. For example, presentation programs can be used in a number of different settings, including work, education, and entertainment. Generally, once the presentation program is running on the computing device 110, the presenter will want to cause the presentation program to move through the individual slides that have been selected for display to the audience. In order to move through the slides, the presenter must be able to convey instructions to the presentation program, or to the software running the presentation program, to advance and move forward to the next slide and/or to reverse and move backward to a previous slide.

The input device 100 is configured to instruct the presentation program to change the current slide of the presentation program by either instructing the presentation program to display the next slide or the previous slide. In a preferred embodiment, the input device 100 can comprise one or more optical sensors 120, 122, an analog-to-digital converter 124, a processing unit 126, and an RF communication module 128.

The input device 100 is preferably configured to detect light from a light source (e.g., a laser pointer) and transmit a signal to the computing device 110 based on the detected light. Optical sensors 120, 122 preferably comprise one or more photoresistors that can detect incident light. In a preferred embodiment, the optical sensors comprise one or more cadmium sulfide (CdS) cells.

Upon exposure to directed light on a surface of the photoresistors, the photoresistors of the optical sensors 120, 122 experience a decrease in resistance. The analog-to-digital converter 124 can be coupled to the optical sensors 120, 122 to convert a continuous signal received from the optical sensors 120, 122 into a digital value that is proportional to the magnitude of the light intensity received by the optical sensors 120, 122.

Although photoresistors are the preferred choice for use as an optical sensor, other types of devices can be used. For example, photovoltaic light sensors (e.g., solar cells) can be used to convert light energy received by the optical sensor into a voltage or current signal indicative of the light received at the optical sensor.

The analog-to-digital converter 124 can be coupled to and/or integrated with a processing unit 126. The processing unit can comprise, for example, a microprocessor or a discrete logic circuit. The processing unit 126 can be configured to determine whether the light intensity or incident dwell time of light at one of the optical sensors 120, 122 exceeds a predetermined threshold amount. If so, the processing unit 126 can send a signal to the RF communication module 128, which in turn transmits an instructional signal 140 to computing device 110. To transmit the instructional signal 140 to the computing device 110, the RF communication module 128 of the input device preferably comprises a transceiver 129 coupled to an antenna 131.

As shown in FIG. 1, input device 100 preferably has two optical sensors. One optical sensor is configured to input a signal that the presenter wants to advance the slide of the presentation program, while the other optical sensor is configured to input a signal that the presenter wants to return (go backwards) to a previously-viewed slide of the presentation program.

Computing device 110 can be a personal computer, such as a desktop or laptop computer. Preferably, the computing device 110 comprises an RF communication module 130 for receiving the instructional signal 140 from the input device 100. The RF communication module 130 of the computing device 110 preferably comprises a transceiver 133 coupled to an antenna 135 for receiving the instructional signal 140 from the input device.

The RF communication device should be compatible with the RF communication module 128 of the input device 100. In a preferred embodiment, both RF communication modules 128 and 130 comprise transceivers that use the Bluetooth® communications protocol. Bluetooth® is particularly convenient as it is a standard wireless protocol compatible with most personal computers. The Bluetooth® transceivers can establish a link between one another so that signals from the input device 100 can be delivered to the computing device 110. In one embodiment, the RF communication module 128 can communicate with the computing device 110 using the protocols, procedures, and features of the standard Bluetooth® Human Interface Device (HID) protocol.

Preferably, the RF communication modules 128, 130 are built-in to the input device 100 and computing device 110, respectively. However, the RF communication modules 128, 130 can comprise other commercially available external adapters, such as a dongle that can be connected to a USB port of the computing device 110 (e.g., a desktop or laptop computer).

The RF communication module 130 is preferably coupled to a user input interface 132 of the computer device 110. The user input interface 132 is also preferably coupled to one or more other input devices, such as a keyboard 134 or mouse 136. Upon receiving the instructional signal 140 from the input device 100, the RF communication module sends a signal to the user input interface 132 that is consistent with the presenter's intent to either advance the presentation forward one slide or reverse the presentation back one slide.

The instructional signal can comprise various input signals. However, preferably, the two different signals associated with the two optical sensors of the input device 100 are the "Page Down" and "Page Up" signals. The "Page Down" and "Page Up" signals are the same as the input signals provided to a desktop or laptop computer when using the function keys of the same name on a computer keyboard. When used in the context with software that displays a presentation program, the Page Down command advances the presentation program from a first slide to the next (second) slide. The Page Up command performs the opposite function, reversing the presentation program by changing the displayed slide from a later (second) slide to a previous (first) slide.

The computing device 110 preferably comprises system memory 142, a processing unit 144, and/or external memory 146 as necessary to run the presentation program on the computing device. In addition, the computing device 110 preferably comprises an output interface 148, which is configured to output the presentation program to a display device 150. The display device 150 can comprise a video monitor, projector, or other type of display means.

Figure 2:
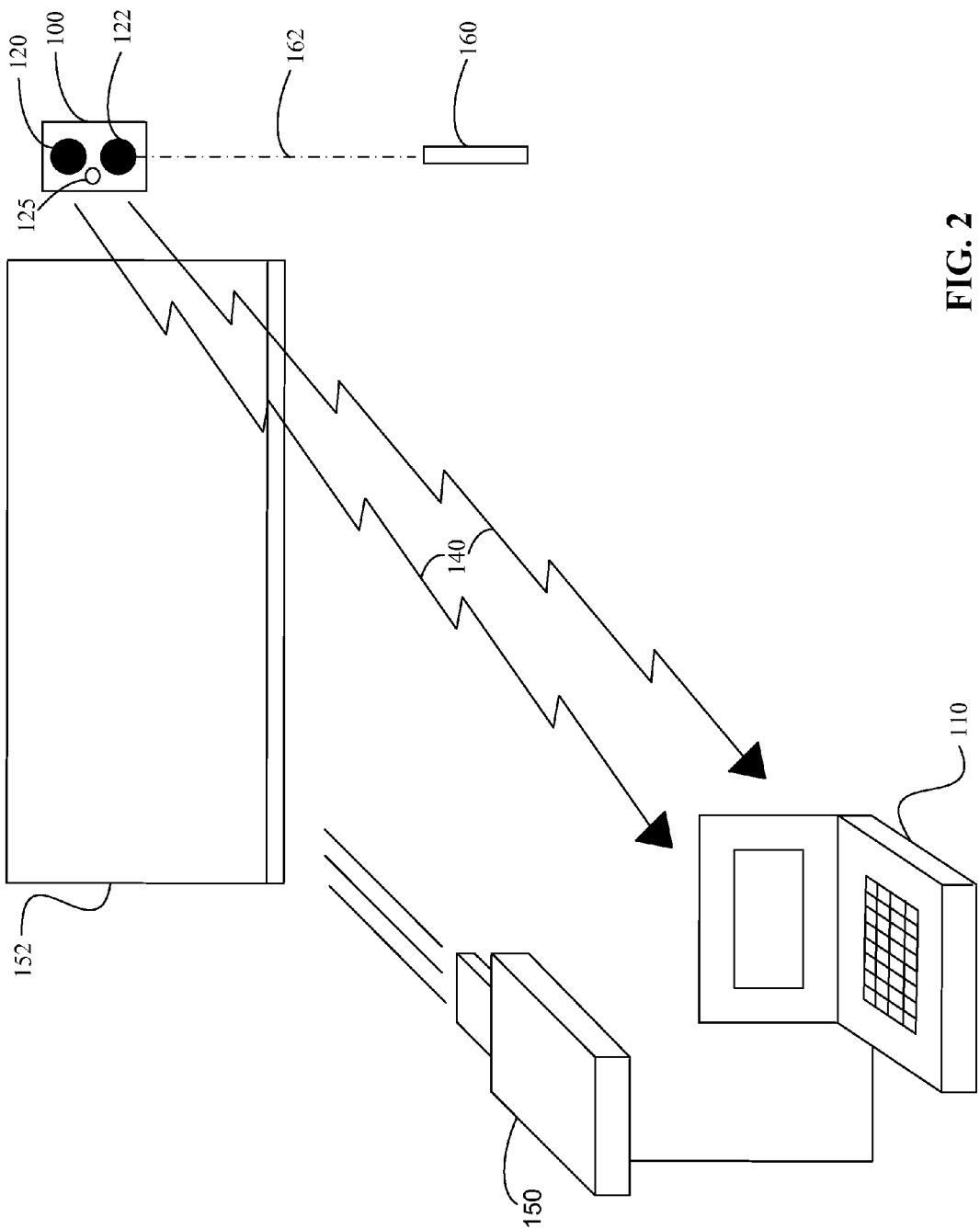
FIG. 2 is a schematic illustration of a system and method for controlling a presentation program using an input device and computing device.

FIG. 2 illustrates an embodiment of a system for remotely controlling a presentation program using input device 100. A computing device 110 is coupled to a display device 150, which is shown as a projector that projects an image onto screen 152. Input device 100 can be positioned so that it is in the line-of-sight of the presenter (not shown). By positioning the input device 100 within the line-of-sight of the presenter, the presenter can use a light-emitting device 160, such as a conventional laser pointer, to control the input device 100.

The use of the laser point as a light-emitting device 160 to control the advancement of the presentation program is particularly convenient. First, presenters commonly use laser pointers when using presentation programs and, therefore, the presenter can advance or reverse the presentation program using a tool that is convenient to the presenter. Second, laser pointers are relatively inexpensive. Therefore, contrary to a conventional remote control device or "clicker," laser pointers can be easily replaced if lost. Third, the input device 100 can be configured to function with most, if not all, types of laser pointers. Therefore, by using optical sensors that are compatible with conventional laser pointers, a system is provided where any laser pointer can effectively act as a "universal remote" to control the presentation program.

As described in more detail above, optical sensor 120 can be configured to correspond with a command to advance the presentation program forward one slide and optical sensor 122 can be configured to correspond to a command to move the presentation program back one slide. In this manner, as the presenter is presenting information to the audience, the presenter can use the light-emitting device 160 to direct a light beam 162 at one of the two optical sensors 120, 122. By directing light from the light-emitting device 160 at the first optical sensor 120, the input device 100 sends an instructional signal to the computing device 110 instructing it to advance the presentation program forward one slide. Similarly, by directing light from the light-emitting device at the second optical sensor 122 (as shown in FIG. 2), the input device 100 sends an instructional signal 140 to the computing device instructing it to move the presentation program backwards one slide. Accordingly, the presenter can change the slide or page of the presentation program without directly accessing the computing device 110.

In a preferred embodiment, the input device 100 is positioned substantially adjacent to the display output (screen) 152. By positioning the input device 100 near the display output 152, as shown in FIG. 2, the presenter can easily direct a light-emitting device 160 at the input device 100 without turning away from the display output or otherwise interrupting the presentation.

The input device is preferably light-weight so that it can be easily transported and/or moved from one location to another. The input device can be powered by any conventional power source, such as A/C or battery power; however, the input device is preferably battery powered so that it can be more easily transported from one location to another, as well as more easily installed (e.g., mounted) at a location substantially adjacent to a display output.

The size and placement of the optical sensors on the input device can vary. Preferably, the input device is relatively small for portability and non-intrusiveness. Also, the narrow beam of most light-emitting devices (e.g., laser pointers) allows for a high degree of accuracy when directing light toward the input device. Thus, the size of each optical sensor is preferably less than about 5 inches in diameter, more preferably less than about 3 inches in diameter, and even more preferably less than about 2 inches in diameter.

Each optical sensor is preferably spaced apart each of the other optical sensors so that the focused beam of light can be directed to one of the plurality of optical sensors without activating an adjacent optical sensor. Preferably, each of the optical sensors is spaced apart from every other optical sensor by at least about one inch, and more preferably about 2 inches or more. This structure advantageously allows the device to be used with a conventional laser pointer. Conventional laser pointers only have a single mode of operation. That is, the light beam is either on or off, and the light beam cannot be modulated in power or intensity. By spacing the optical sensors apart from one another on all sides, light of a single type (e.g., light of substantially the same power/intensity) from the laser points can function both as (1) a guiding means to let the user know that he/she is aiming the light beam at the desired target and (2) an activation means to activate the optical sensors. If the optical sensors are not spaced apart as described herein, the system would mistakenly activate sensors while the user is trying to position the light source on a desired optical sensor.

Although it is preferable to have the input device comprise a single housing, it may be desirable to split the device into two or more structures. Thus, for example, a first housing could comprise a first optical sensor and a second housing could comprise a second optical sensor. In this manner, the first and second optical sensors could be placed further apart to help reduce the likelihood that a presenter will inadvertently direct light at one optical sensor when the presenter intends to direct light at the other optical sensor. Of course, in such an embodiment, it would be necessary to provide a second RF communication module and/or to provide some other link (wireless or wired) between the two input devices.

The input device 100 can be adjusted to alter the dwell time required for activating the operations described above (e.g., moving the presentation forward or backward one slide). The dwell time is preferably relatively short. In a preferred embodiment, the dwell time is less than about three seconds. Preferably, the dwell time is between about 0.05 and 2.0 seconds, and more preferably about 0.25 and 1.0, seconds, and most preferably between about 0.5 and 0.75 seconds. It should be understood that shorter or longer dwell times can be used with the system. For example, the system can be configured to react instantly to incoming light of a certain intensity and, in such a configuration, a dwell time of less than 0.05 may be acceptable.

In another embodiment, the optical sensor(s) can be additionally, or alternatively, configured to have a refractory period in which light from a light emitting device cannot trigger or stimulate the optical sensor(s). For example, in operation, a first light beam can be directed at an optical sensor of the system to advance a presentation program. After activating the sensor by receiving light at the sensor, the optical sensor can be configured so that it cannot be re-activated for a certain amount of time (i.e., the refractory period). Thus, the sensor will not be repeatedly activated when a user aims a light emitting device at the sensor and that light sensor passes over the optical sensor within the refractory period. By this arrangement accidental advancement of the presentation program (or reversing or other action of the presentation program) can be reduced.

In another embodiment, the dwell time of light on a sensor can be configured and/or adjusted to provide different functions associated with controlling the presentation program. For example, the device can be configured so that a dwell time that exceeds a certain predetermined value will cause a different action to occur than a dwell time that does not exceed that value. Such different functions can include rapid advancement of the presentation program. Thus, in one embodiment, a less than half-second dwell time will advance (or reverse) the presentation program by one slide, while a dwell time that is greater than a half second will advance (or reverse) the presentation program by more than one slide. That is, if the dwell time exceeds the predetermined value (a half second in this example) rapid advancement (or reversal) of the presentation program will occur. Rapid advancement can comprise the continued advancement of the presentation program until the light (e.g., laser beam) is removed from the optical sensor.

In a preferred embodiment, the predetermined value of dwell time after which a different action, such as rapid advancement, is triggered can be about a half second or greater, more preferably about one second or greater, and even more preferably about two seconds or greater. It should be understood that in addition to rapid advancement, extended, predetermined dwell times can be used to achieve other features or actions that are useful to control a presentation program.

In addition to adjusting dwell time, the light sensitivity of the input device can be adjusted. For example, if the device is in a very bright room, it may be desirable to increase the sensitivity of the device so that it does not register false activations. Thus, a "calibration" function can be performed wherein the ambient light present during presentation conditions (i.e., lights on, off or dimmed) can be sampled and stored as a "baseline" value against which subsequent strikes by the laser pointer would be compared. The sampling of the light conditions can be performed by the optical sensors described above or it could be performed by additional optical sensors provided on the input device or a device in communication with the input device. Referring to FIGS. 1A and 2, input device 100 can further comprise an optional calibration optical sensor 125 that is configured to receive ambient light. Based on the amount of ambient light received by the calibration sensor 125, the device can be adjusted so that it is more sensitive to illumination by the laser pointer and less sensitive to ambient light changes (e.g., passing shadows). This calibration function can be user initiated or automatic (e.g., configured to run each time the device is powered up or upon other intervals).

In another embodiment, the input device comprises specific wavelength filters that are positioned to at least partially cover the optical sensors. For example, as shown in FIG. 3, the input device 100 can further comprise wavelength filters 170 that are positioned over the optical sensors 120, 122 (i.e., between the light emitting device and the optical sensors). The selected wavelength filter can permit light of the wavelength emitted by the light emitting device (e.g., the laser pointer) to pass through the filter 170 and block light of other wavelengths, thereby making the device less sensitive to ambient light. For example, the wavelength filters can comprise band-pass filters that pass light of a particular wavelength range (or frequency range) and reject wavelengths of light outside that range. This approach can be used in connection with any type of light emitting device. For example, a filter that passes light in the green spectrum can be used with a green laser pointer, a filter that passes light in the red spectrum can be used with a red laser pointer, etc.

In yet another embodiment, the optical sensors can comprise lenses, reflectors, or other optical devices that can be used in conjunction with one or more photoresistors or other such sensors. Thus, light from an area that is larger than the size of the photoresistors can be collected and directed to the photoresistor(s). For example, as shown in FIG. 4, a lens 171 can be positioned to increase a target size of the optical sensor. That is, a target size that is the surface area of the optical sensor is increased to a target size that is the surface area of the lens 171 (or the surface area of lens 171 plus the surface area of the optical sensor if the two areas are not entirely overlapping). Alternatively, or in addition to lens 171, reflectors 172 can be positioned to reflect light to the optical sensors to similarly increase the target area. Reflectors 172 can be configured to reflect or redirect light from the light emitting device from an area away from or outside of the original target area (of the optical sensors) to the optical sensors. In this way the effective target area can be increased without increasing the size of the photoresistor(s). This can be particularly useful when using CdS cells, because such cells are not typically very large.

Although two optical sensors are used in a preferred embodiment, control of the presentation program can be achieved by using other numbers of optical sensors. For example, a single optical sensor can be used if the input device is configured to account for the receipt of pulses of light of varying time intervals (i.e., dwell time). Thus, a longer pulse of light directed at the single optical sensor can trigger a first operation (e.g., advancing a presentation forward one slide) and a shorter pulse of light directed at the single optical sensor can trigger a second operation (e.g., moving the presentation backwards one slide). Alternatively, control of the presentation program can be achieved by varying the number of pulses directed at the input device 100. Thus, one pulse could be used to trigger a first operation and two or more pulses (within a predefined time period) can be used to trigger second operation.

In the same manner, a single optical sensor can be used to control additional features of the presentation program. For example, a longer dwell time on a first optical sensor can advance the presentation program all the way to the last slide, and a longer dwell time on a second optical sensor can reverse the presentation program all the way to the beginning.

Alternatively the number of optical sensors can be greater than two, and the number of functions available that can be triggered by activation of the sensors can be increased. For example, in an embodiment illustrated in FIG. 5, a first unit 200 can comprise a first optical sensor 202 along with the A/D (not shown), the processing unit (not shown), and the RF communication module (not shown). It should be understood that the components of first unit 200 that are not shown can be identical or similar to those components discussed above, such as those illustrated in FIG. 1. Other optical sensors can be mounted remotely from first unit 200 and configured to communicate with first unit 200.

Figure 5:
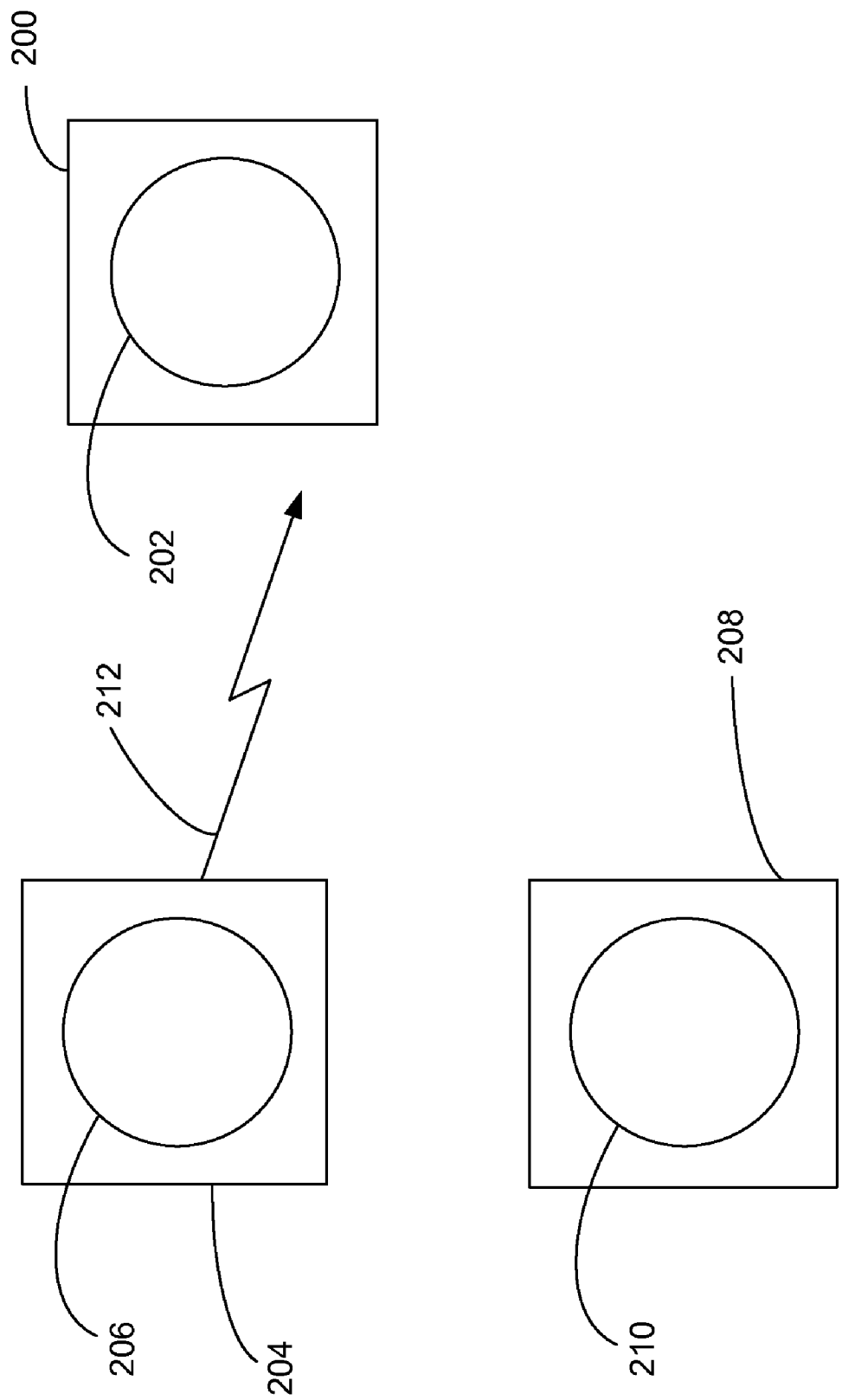
FIG. 5 is a schematic illustration of an input device of the present disclosure, shown with optional remote units.

FIG. 5 illustrates two additional remote sensors: second unit 204 comprising second optical sensor 206 and third unit 208 comprising third optical sensor 210. Second unit 204 and third unit 208 can be configured to receive light at their respective sensors and communicate the activation of their respective sensors to the first unit, either through a wired or wireless connection. For example, FIG. 5 illustrates second unit 204 communicating to first unit 200 via a wireless signal 212. Wireless signal 212 can comprise any type of signal as discussed herein, including, for example, wireless RF connections, Bluetooth®, infrared light beam, etc. The remote sensors can be positioned in various locations relative to each other and the screen. It should be understood that although only two remote sensor units are shown in FIG. 5, any number of remote sensor units can be provided.

In addition, if desired, the function of the additional optical sensors when triggered by the laser pointer can be configurable by the user. For example, the user can configure the optical sensors to transmit additional keyboard codes, thereby further extending the usefulness of the device.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An input, device for controlling a presentation program that is being run on a remote computing device, the presentation program including at least a first slide and a second slide, the input device comprising:
    a plurality of optical sensors configured to be activated by exposure to a focused beam of light and configured to generate one or more signals upon exposure to the focused beam of light, the focused beam of light originating from a source independent of the input device;
    a processing unit configured to receive the signals and produce an instructional signal containing an instruction for changing a displayed slide of the presentation program from the first slide to the second slide; and
    an RF communication device configured to wirelessly deliver the instructional signal to the remote computing device,
    wherein each optical sensor is spaced apart from each of the other optical sensors so that the focused beam of light can be directed to one of the plurality of optical sensors without activating an adjacent optical sensor; and
    wherein the input device is selectively mountable at any location adjacent a display output such that the input device is located within a line-of-sight of a presenter.

2. The input device of claim 1, wherein the first and second slides are ordered in the presentation program so that the first slide comes before the second slide,
    wherein the plurality of optical sensors comprises a first optical sensor and a second optical sensor, and
    wherein activation of the first optical sensor results in a first instructional signal for changing the displayed slide of the presentation program from the first slide to the second slide and activation of the second optical sensor results in a second instruction signal for changing the displayed slide from the second slide to the first slide.

3. The input device of claim 2, wherein the RF communication device comprises a Bluetooth transceiver.

4. The input device of claim 2, wherein the first and second optical sensors each comprise one or more cadmium sulfide cells.

5. The input device of claim 2, wherein the first instructional signal comprises a Page Down command and the second instructional signal comprises a Page Up command.

6. The input device of claim 2, wherein the first and second optical sensors are configured to be activated by exposure to a focused beam of light directed from a laser pointer.

7. The input device of claim 2, wherein the processing unit comprises an analog-to-digital converter for converting the signals generated by the optical sensors to one or more numerical values, and
    wherein the processing unit compares the numerical values against one or more predetermined values to determine whether the first or second instructional signals should be produced.

8. The input device of claim 7, wherein the predetermined values are adjustable.

9. The input device of claim 7, wherein the predetermined values correspond to a dwell time of the focused beam of light on the first or second optical sensors, the dwell time being between about 0.50 and 0.75 seconds.

10. The input device of claim 2, wherein the input device comprises only two first and second optical sensors.

11. The input device of claim 1, further comprising a calibration member, the calibration member being configured to receive ambient light and adjust the sensitivity of the optical sensors based on a value assigned by the calibration member to the received ambient light.

12. A kit for controlling a presentation program that is being run on a remote computing device and outputted to a display device, the kit comprising:
    a laser pointer for generating a focused beam of light; and
    a portable input device configured to be positioned adjacent the display device, the portable input device being physically separate from the laser pointer and independently movable relative to the laser pointer and the remote computing, device, the portable input device comprising:
    a first photoresistor sensor having a first light sensitive surface;
    a second photoresistor sensor having a second light sensitive surface;
    a processing unit coupled to the first and second photoresistor sensors, the processing unit being configured to produce a first instructional signal when a focused beam of light is directed at the first light sensitive surface and a second instructional signal when a focused beam of light is directed at the second slight sensitive surface; and
    an RF communication device coupled to the processing unit and configured to transmit the first and second instructional signals to the remote computing device,
    wherein the first instructional signal is configured to advance the presentation program displayed on the display device and the second instructional signal is configured to reverse the presentation program displayed on the display device.

13. The kit of claim 12, wherein the first and second photoresistor sensors are spaced apart from each other so that the focused beam of light can be directed to either of the first and second photoresistor sensors without activating the other photoresistor sensor.

14. The kit of claim 12, wherein the first instructional signal comprises a Page Down command and the second instructional signal comprises a Page Up command.

15. The kit of claim 12, wherein the laser pointer has only a single mode of operation in which the laser pointer generates light of substantially the same power or intensity.

16. The kit of claim 12, wherein the first or second instructional signals are not produced unless a focused beam of light remains on the first or second photoresistor sensors for a predetermined amount of time, and after, the first or second instructional signals are produced the first or second photoresistor sensors cannot be re-activated for a certain amount of time.

17. The kit of claim 16, wherein the predetermined time required to produce the first or second instructional signals is between about 0.25 and 1.0 seconds.

18. The kit of claim 16, wherein predetermined amount of time is adjustable by a user.

19. The kit of claim 12, wherein the laser pointer emits light of a first wavelength, and the kit further comprises one or more wavelength filters that at least partially cover the first and second photoresistor sensors, the one or more wavelength filters being configured to allow light of the first wavelength to pass through the wavelength filter.

20. The kit of claim 12, further comprising a lens or a reflector configured to direct light at the first and second photoresistor sensors, the lens or reflector configured to increase a target size of the first and second photoresistor sensors.

21. A method of presenting a presentation program comprising:
   running a presentation program on a computing device and displaying the presentation program on a display device;
   providing an input device having a first optical sensor, a lens, at least one reflector, at least one battery, and a Bluetooth compatible transceiver, the lens and at least one reflector acting to increase the target area of the first optical sensor;
   positioning, the input device adjacent the display, the input device being selectively mountable at any location independent of the presence of an electrical outlet;
   activating the input device and establishing a wireless communication link between the Bluetooth compatible transceiver and the computing device;
   providing a laser pointer that emits focused light that cannot be modulated in power or intensity;
   directing light from the laser pointer at the first optical sensor and causing the input device to produce a first instructional signal that is indicative of an instruction to advance the presentation program;
   transmitting the first instructional signal to the computing device to advance the presentation program via the wireless communication link; and
   wherein the first optical sensor is configured such that after it is activated by receiving focused then from the laser pointer, it cannot be reactivated for a certain amount of time.

22. The method of claim 21, wherein the input device further comprises a second optical sensor and the method further comprises:
   directing light from the laser pointer at the second optical sensor and causing the input device to produce a second instructional signal that is indicative of an instruction to reverse the presentation program, and
   transmitting the second instructional signal to the computing device to reverse the presentation program via the wireless communication link.

23. The method of claim 22, further comprising providing only two first and second optical sensors and spacing the first and second optical sensors apart from one another so that the focused light can be directed to one of the two optical sensors without activating the other optical sensor.

* * * * *